(12) United States Patent
Schmit et al.

(10) Patent No.: US 9,001,223 B2
(45) Date of Patent: Apr. 7, 2015

(54) METHOD AND APPARATUS FOR APPLYING CAMERA SHAKE COMPENSATION TO VIDEO CONTENT

(75) Inventors: Michael L. Schmit, Cupertino, CA (US); William Herz, Hayward, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 32 days.

(21) Appl. No.: 13/247,293

(22) Filed: Sep. 28, 2011

(65) Prior Publication Data
US 2013/0076920 A1      Mar. 28, 2013

(51) Int. Cl.
*H04N 5/228* (2006.01)
*H04N 5/14* (2006.01)
*H04N 5/232* (2006.01)

(52) U.S. Cl.
CPC ........... *H04N 5/144* (2013.01); *H04N 5/23254* (2013.01); *H04N 5/23267* (2013.01)

(58) Field of Classification Search
USPC ........ 348/208.99, 208.3, 208.4, 208.5, 219.1; 396/13, 52–55, 50; 382/107; 359/554–557; 386/263–264
See application file for complete search history.

(56) References Cited

U.S. PATENT DOCUMENTS

| | | | |
|---|---|---|---|
| 7,603,025 B2 * | 10/2009 | Rinaldi .................... | 386/252 |
| 2005/0078176 A1 * | 4/2005 | Yuan et al. ................. | 348/97 |
| 2007/0211170 A1 * | 9/2007 | Ramaswamy et al. ........ | 348/552 |
| 2010/0123787 A1 * | 5/2010 | Yamanaka ................ | 348/208.4 |
| 2010/0254453 A1 * | 10/2010 | Dane et al. ............. | 375/240.12 |
| 2012/0069204 A1 * | 3/2012 | Shimizu et al. ............ | 348/208.4 |

* cited by examiner

*Primary Examiner* — Mekonnen Dagnew
(74) *Attorney, Agent, or Firm* — Volpe and Koenig, P.C.

(57) ABSTRACT

A system and method for applying video de-shake to video content includes a classification engine configured to generate a classification of the video content based on at least one source characteristic. The system also includes a de-shake engine configured to selectively apply camera shake compensation to the video content based on the classification. The classification engine may be configured to generate a classification based on, for example, the presence of closed caption data, the presence of copy protection data, current frame rate associated with the video content, or a native frame rate associated with the video content.

17 Claims, 6 Drawing Sheets

METHOD AND APPARATUS FOR APPLYING CAMERA SHAKE COMPENSATION TO VIDEO CONTENT

FIELD OF INVENTION

This invention relates to apparatus and methods for video de-shake or camera shake compensation.

BACKGROUND

There are many standard algorithms for implementing video de-shake or camera shake compensation. Some systems use one or more stabilization filters that correct a non-stabilized image by tracking the movement of specific pixels in a video image and correcting the image by moving the frame. In general, the filter either crops the image down to hide the motion of the frame or attempts to recreate the lost image at the edge through spatial or temporal extrapolation. Such systems lack a mechanism to automatically determine whether the video content at issue is suitable for camera shake compensation.

SUMMARY OF EMBODIMENTS OF THE INVENTION

A system and method for applying video de-shake to video content include a classification engine configured to generate a classification of the video content based on at least one source characteristic. The system also includes a de-shake engine configured to selectively apply camera shake compensation to the video content based on the classification. The classification engine may be configured to generate a classification based on the presence of closed caption data, the presence of copy protection data, a current frame rate associated with the video content, or a native frame rate associated with the video content.

The classification engine may be configured to perform an inverse Telecine on the video content, determine a native frame rate, and generate a classification based on the native frame rate. The classification engine may be configured to classify the video content as professional content or non-professional content. The classification engine may be configured to convert the video content to a native frame rate and the de-shake engine may be configured to apply camera shake compensation to the video content at the native frame rate. The classification engine may be configured to restore the video content to an original frame rate after camera shake compensation. The system may be implemented in a variety of configurations including, but not limited to, a device driver or application program.

BRIEF DESCRIPTION OF THE DRAWINGS

A more detailed understanding may be had from the following description, given by way of example in conjunction with the accompanying drawings, wherein.

DETAILED DESCRIPTION

A variety of algorithms exist for implementing video de-shake or camera shake compensation. It should be understood that a wide variety of video de-shake techniques are suitable for use with the disclosure contained herein. Most techniques are based on detecting and removing random camera motion from frame to frame. A motion estimator may be used to find the overall motion between each frame in a sequence of images. Shaking of the camera adds a fixed component of motion (in both X and Y directions), but it varies per image in some random manner. The averaged or smoothed motion is typically calculated from the measured optic flow of motion. The smoothed optic flow is subtracted from the measured optic flow (in both X and Y directions) and the result is the camera shake motion. This camera shake motion is used to compensate the source images and results in a stabilized image. Additionally, some adjustment is performed at the edges of the images because some pixels will need to be trimmed or magnified to maintain a correct view. Certain video content does not require, or is unsuitable for, camera shake compensation. Application of de-shake techniques to such video content often produces unsatisfactory results.

Prior to application of camera shake compensation, various parameters may be used to classify video content at issue. For example, video content can be classified as "professional" or "non-professional" based on various source characteristics. Depending on this classification, a video de-shake system can make an intelligent choice regarding the application of camera shake compensation. Typically, non-professional video content is suitable for video de-shake. However, professional content may be unsuitable for routinely applied camera shake compensation. In many cases, professional content has already been stabilized. Application of camera shake compensation to such content can produce unpredictable image shifts. In some cases, professional video content includes deliberately induced camera shake. Application of camera shake compensation to such content will at least partially remove the deliberately induced shake. In one embodiment, video de-shake is not applied to video content classified as professional. In another embodiment, various thresholds are adjusted so that camera shake compensation is selectively applied. For example, mild shaking can be removed but severe shaking (likely intentionally induced) can be retained.

Figure 1:
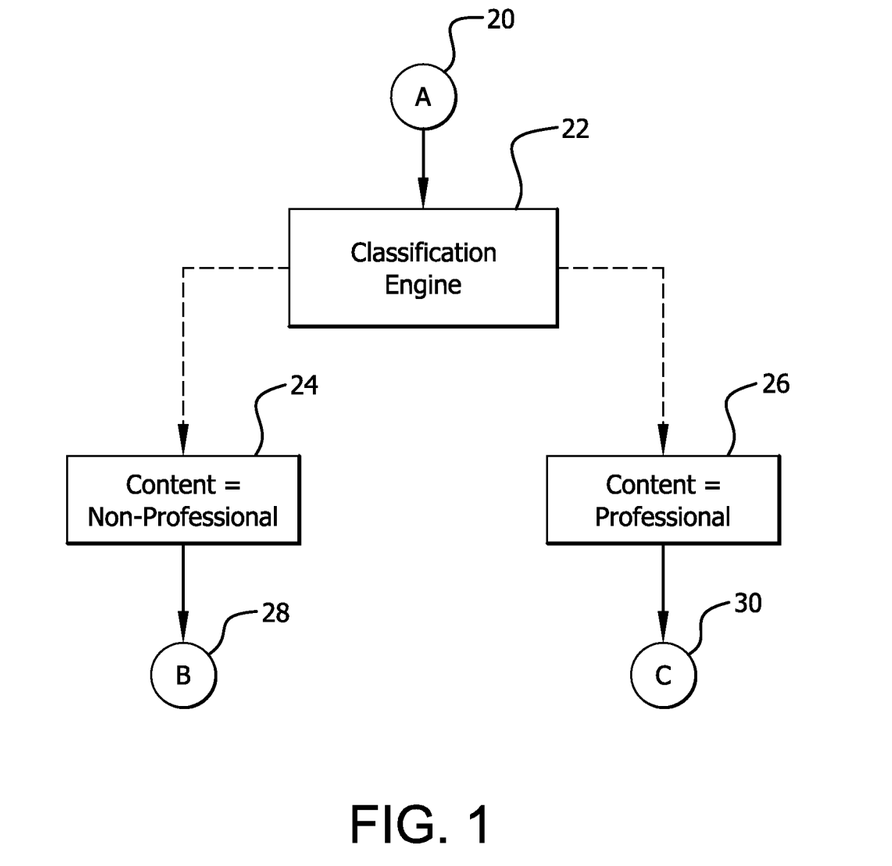
FIG. 1 is flow diagram showing a video content source determination technique.

FIG. 1 is a flow diagram showing a video content source determination technique. It should be understood that any flow diagrams contained herein are illustrative only and that other entry and exit points, time out functions, error checking functions, and the like that would normally be implemented in a typical system are not shown herein for simplicity. Any beginning and ending blocks are intended to indicate logical beginning and ending points for a given subsystem that can be integrated into a larger device and used as needed. The order of the blocks may also be varied without departing from the scope of this disclosure. Implementation of these aspects is readily apparent and is within the knowledge of those skilled in the art based on the disclosure herein.

Processing begins at block A (20). Video content is analyzed by a classification engine 22 to determine whether it is professional content or non-professional content. If the video content is classified as non-professional content, control is passed to block 24 and further processing may be performed as shown by block B (28). If the video content is classified as professional content, control is passed to block 26 and further processing may be performed as shown by block C (30).

Figure 2:
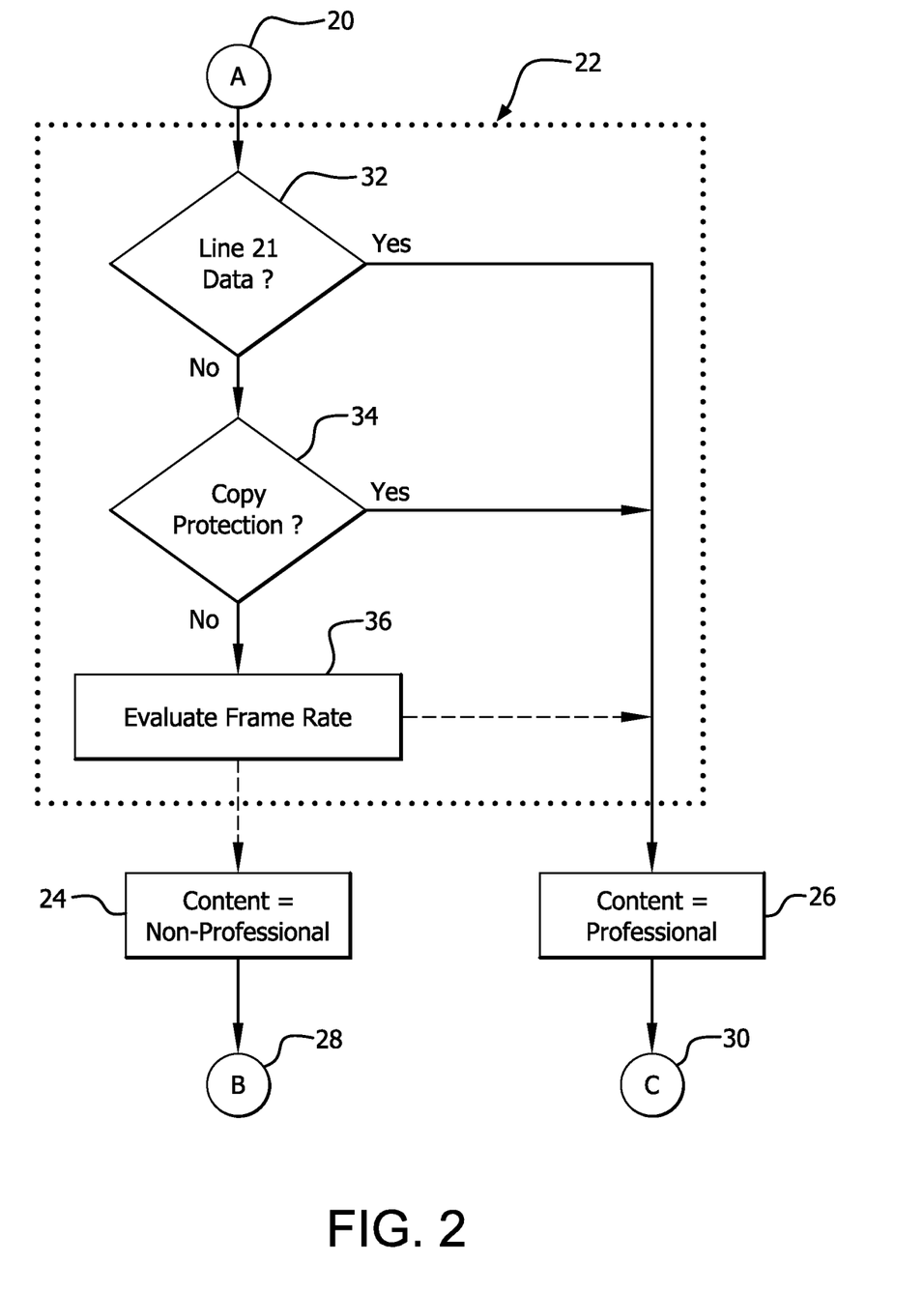
FIG. 2 is a more detailed flow diagram showing a video content source determination technique.

FIG. 2 is a more detailed flow diagram showing a video content source determination technique implemented by a classification engine 22. Processing begins at block A (20). Video content is analyzed by classification engine 22 to determine whether it is professional content or non-professional content. Video content typically contains a video portion, an audio portion, and may also contain additional data. A variety of parameters may be used for source determination. For example, some video content may include a text data stream in addition to the video and audio portions. For example, the video content may contain "line 21" data. Such data typically includes closed captioning information with text for display along with the video information, which provides a transcription of a portion of the associated audio. Line 21 data is generally inserted in a known location within the video content and can be specified by a standard such as the Electronic Industries Alliance—EIA-608 and Advanced Television Systems Committee ATSC A/53. Existence of line 21 data is an indicator that the video content is professional content.

The video content in question is tested for the presence of line 21 data (block 32). If such data is present, control is passed to block 26 and the content is identified as professional content. If no line 21 data is present, the video content is tested for the presence of copy protection (an example of which is Macrovision®; block 34). If any copy protection is present, control is passed to block 26 and the content is identified as professional content. If no copy protection is present, control is passed to block 36 for frame-rate based testing.

Figure 3:
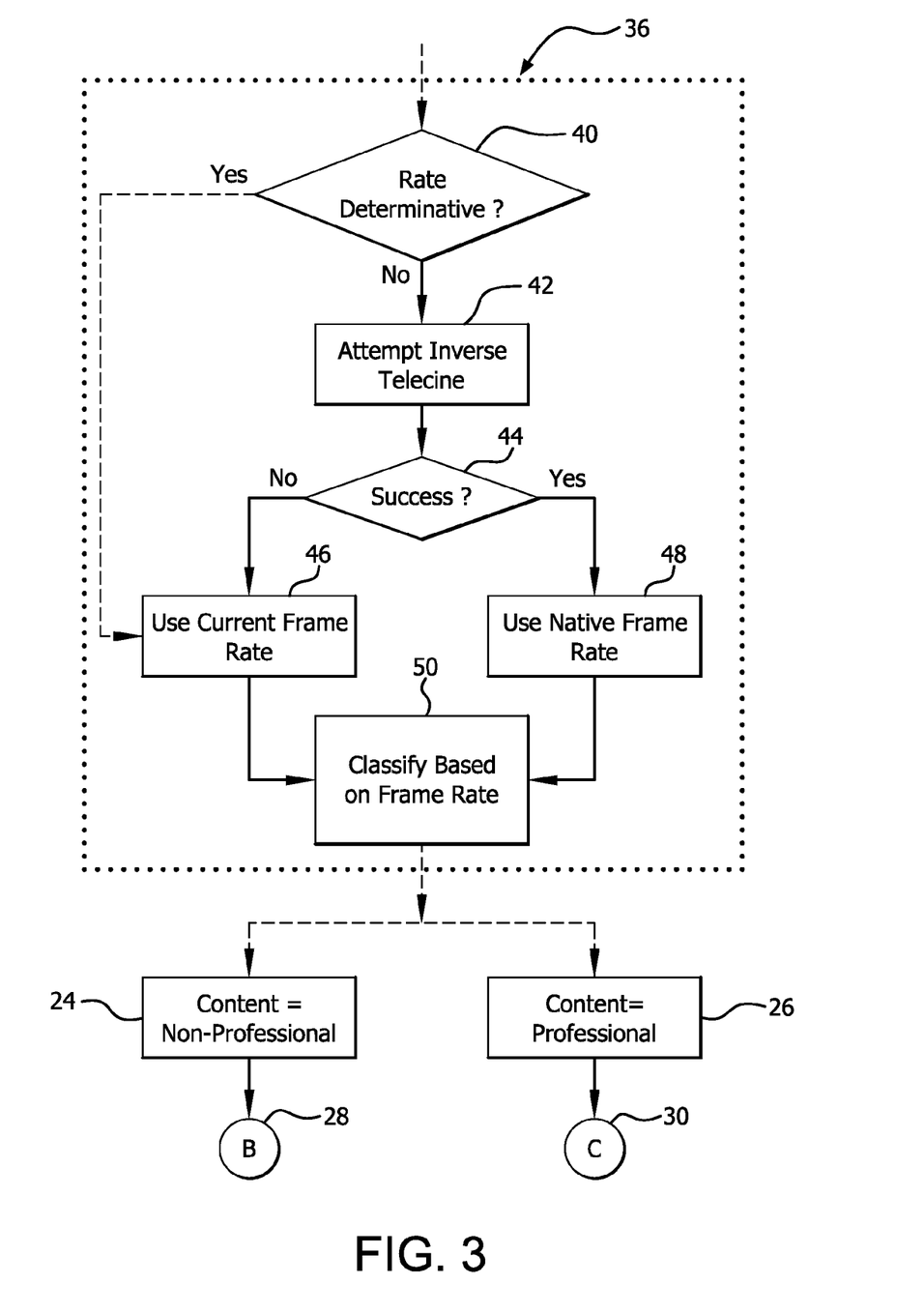
FIG. 3 is a flow diagram showing frame rate processing.

FIG. 3 is a flow diagram showing frame rate processing. Video content may formatted in one of a variety of frame rates. The current frame rate alone may be sufficient to determine whether the video content is from a professional source or a non-professional source (block 40). For example, if the current frame rate is 15 frames per second (fps), the video content may be classified as non-professional. If the current frame rate is 24 fps, the video content may be classified as professional. It should be noted that 24 fps is the "typical" Hollywood frame rate for film (movie projectors normally double flash each frame, thus producing 48 fps).

Video content encoded at other frame rates may require additional processing to make a source determination. In some cases, video content may have undergone Telecine processing to convert from a native frame rate to another frame rate (e.g., 3:2 pulldown). For example, Telecine processing may be used to convert from a film-based frame rate (e.g., 24 fps) to another frame rate such as 29.97, 30, 50, or 60 fps. Some video content may be interlaced or progressive scan. An inverse Telecine is attempted (block 42). The success or failure of the inverse Telecine process is tested (block 44). If the inverse Telecine is successful, the native frame rate is identified (block 48). If the inverse Telecine is not successful, the current frame rate is used; i.e., the current frame rate is determined to be the native frame rate (block 46). The native frame rate can generally be used to identify a video as originating from a professional source or a non-professional source. The video content is classified based on the frame rate (block 50).

In general, a native frame rate of 24 fps is indicative of professional content. However, those of skill in the art would understand that the particular frame rates classified herein as professional or non-professional may change based upon evolving technologies or current needs. In this particular example, a native frame rate of 24 fps is determined to be professional content and all other native frame rates are determined to be non-professional content. Table 1 contains an example of such classification:

TABLE 1

| Native Frame Rate (fps) | Source |
| --- | --- |
| 15 | non-professional |
| 24 | professional |
| 25 | non-professional |
| 29.97 | non-professional |
| 30 | non-professional |
| 50 | non-professional |
| 60 | non-professional |
| 72 | non-professional |

It should be understood that the classification engine 22 may store the classification definitions from Table 1 in programmable locations, such as a memory (not shown). The default values shown in Table 1 may be changed as needed. It should also be noted that these or other frame rates may be classified as being from a professional or non-professional source as desired.

Figure 4:
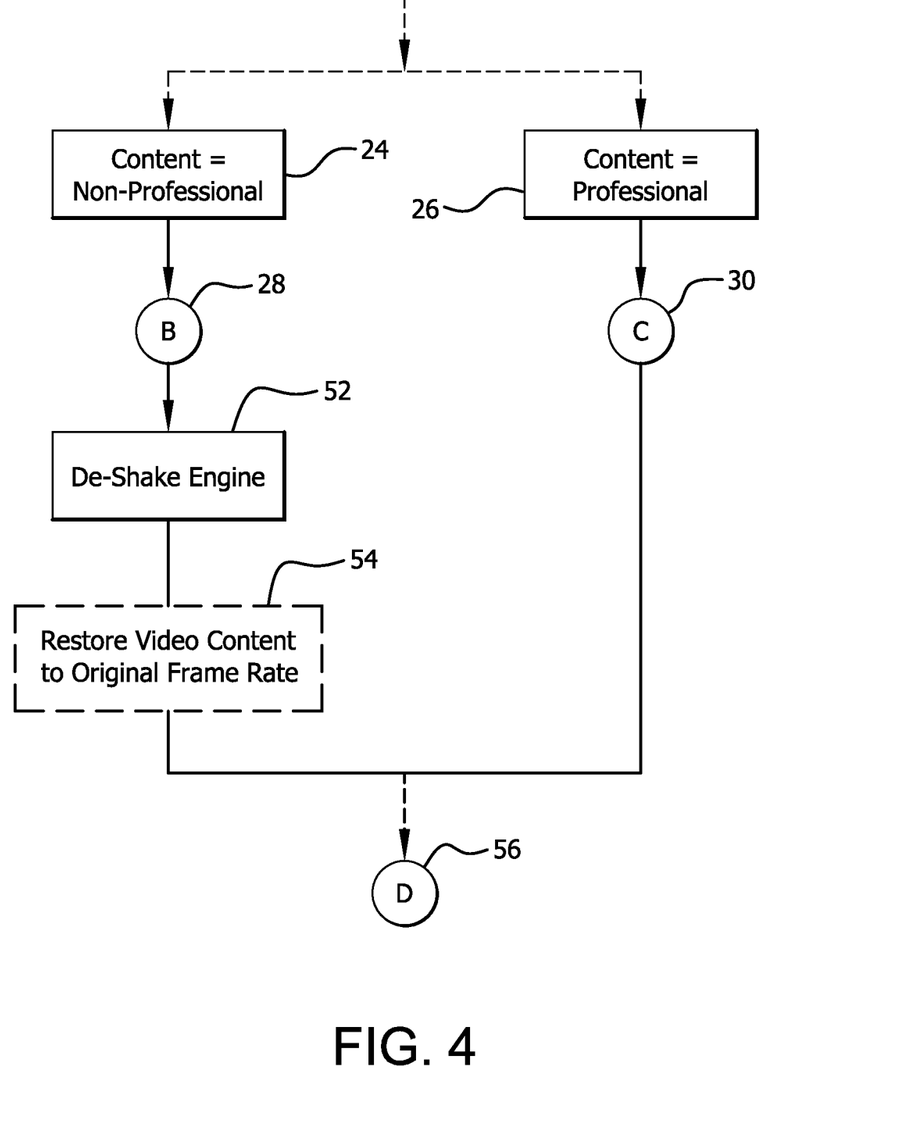
FIG. 4 is a flow diagram showing a video de-shake implementation with content source determination.

Once the video content has been classified by classification engine 22, video de-shake may be applied. FIG. 4 shows a flow diagram with a video de-shake implementation with content source determination. In this example, the video content is classified (e.g., as shown in FIGS. 1-3). Video content classified as non-professional has video de-shake applied by a de-shake engine 52. De-shake may be applied to the video content at its native frame rate for optimal results. For example, video content may be received as 60 fps. Following an inverse Telecine operation, the video content is converted to a native frame rate of 30 fps. In this example, de-shake processing may be applied to the video content in 30 fps format. The video may be restored to its original frame rate (e.g., via a Telecine process; block 54). If the video content is classified as professional content, de-shake processing is not applied and control is passed to block 56 for further processing.

Figure 5:
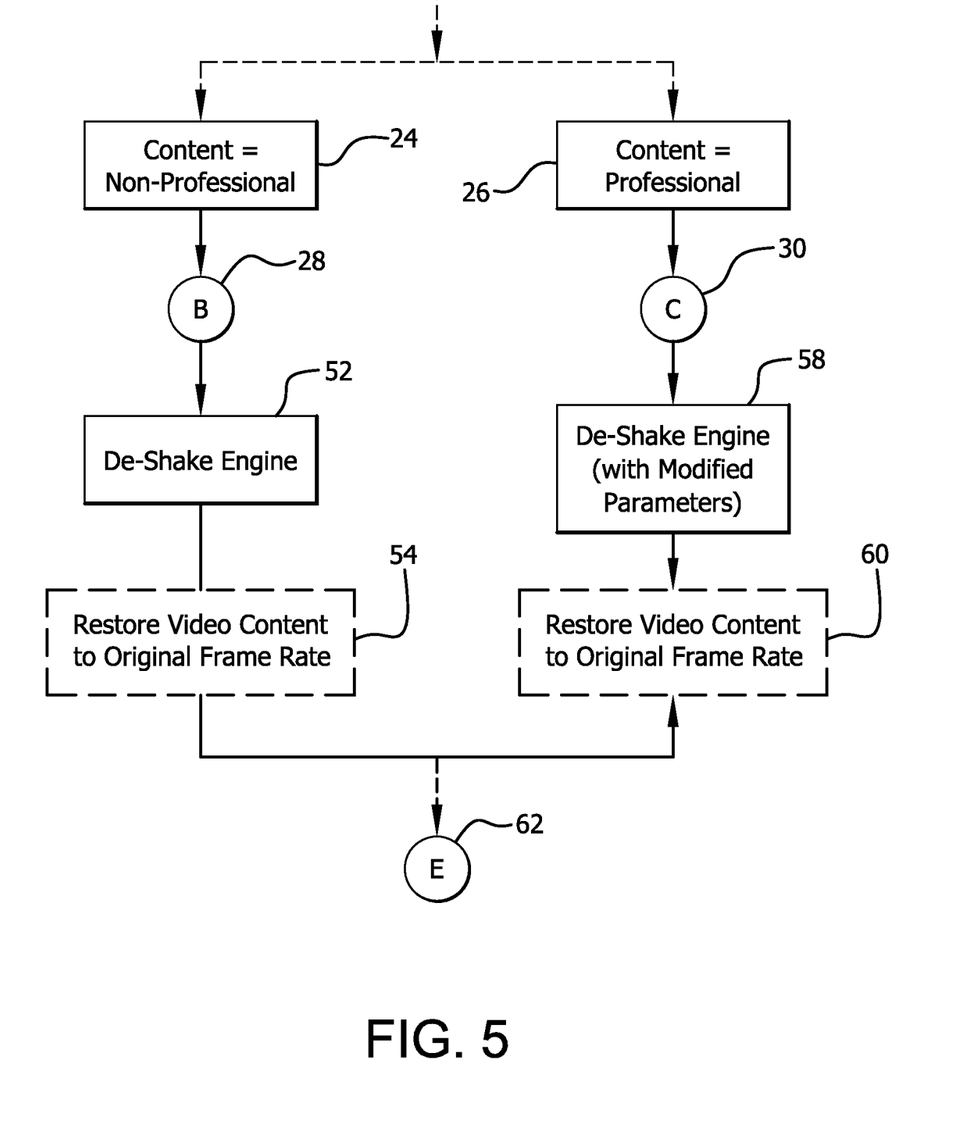
FIG. 5 is a flow diagram showing another embodiment of a video de-shake implementation with content source determination.

FIG. 5 shows a flow diagram with another embodiment of a video de-shake implementation with content source determination. In this example, the video content is classified (e.g., as shown in FIGS. 1-3). Video content classified as non-professional has video de-shake applied by the de-shake engine 52. The video may be restored to its original frame rate (e.g., via a Telecine process; block 54).

If the video content is classified as professional content, de-shake may be applied, but with modified parameters by a de-shake engine 58. For example, the de-shake engine 58 may be configured to remove mild shaking. Once a given threshold is exceeded, de-shake may be disabled. The video may be restored to its original frame rate (e.g., via a Telecine process; block 60).

After the de-shake is performed (blocks 52, 58) and the video optionally restored to its original frame rate (blocks 54, 60), further processing may be performed as shown by block E (62).

Figure 6:
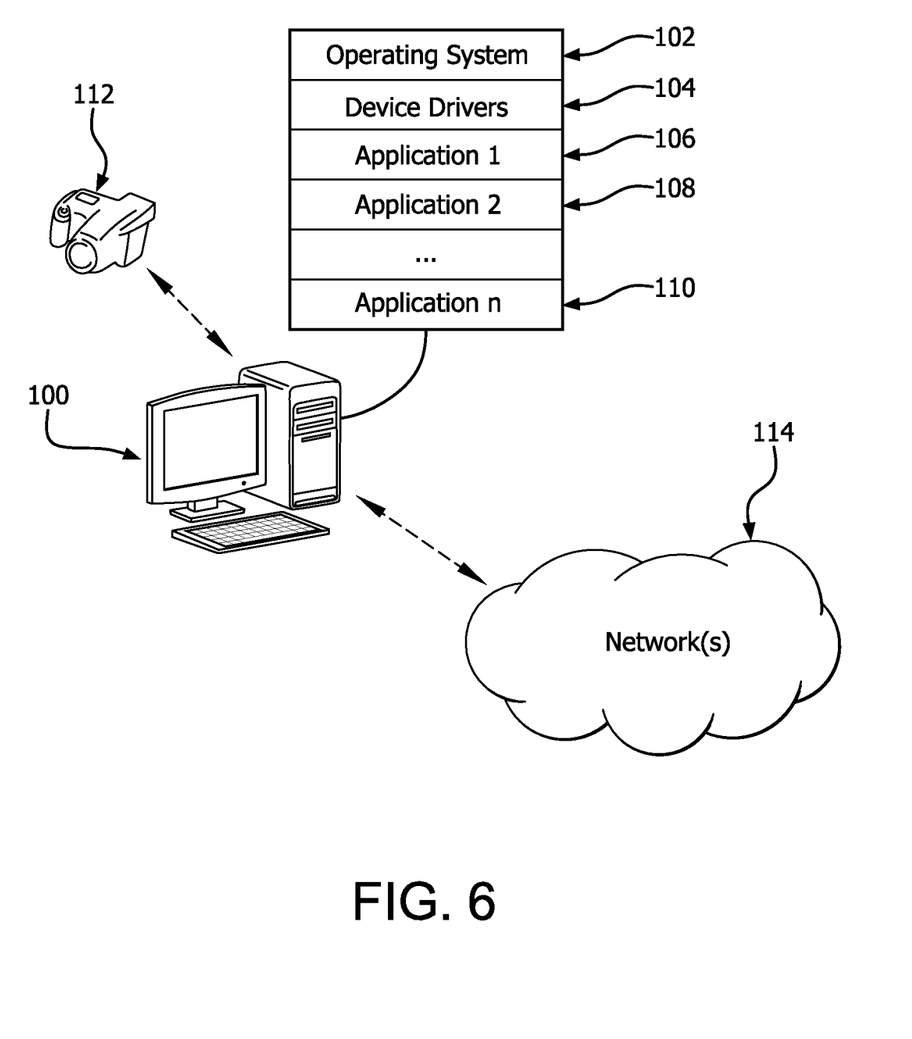
FIG. 6 is a computer system configured with a video de-shake implementation with content source determination.

FIG. 6 is a computer system 100 configured for video de-shake with content source determination. The computer system 100 includes typical computer components such as a central processing unit (CPU), video display adapter, random access memory, non-volatile random access memory (e.g., hard disk drive, solid state drive), input/output devices, various interfaces (universal serial bus, network interface) and the like. The computer system 100 generally includes an operating system 102 and a plurality of device drivers 104. The computer system 100 is configured to run one or more application programs 106-110. Device drivers 104 generally allow the operating system and/or application programs to interact with specific various devices. For example, the computer system 100 may include a device driver(s) 104 for its video display adapter(s) and network adapter(s). Another device driver may be used to connect a camera 112.

The video de-shake techniques disclosed herein may be integrated into the computer system 100 in a variety of ways. For example, the video de-shake techniques disclosed herein may be integrated into an appropriate device driver 104. Upon transfer of video content from an external source, the content may be automatically processed. Video content may be classified and de-shake may be selectively applied as discussed above. Content from a consumer camera at 30 fps will generally be classified as non-professional and have de-shake applied. Content from other sources (e.g., network 114) may be classified and processed as disclosed above. In another embodiment, the video de-shake techniques disclosed herein may be integrated into an application program 106-110, such as a video editor. It should be understood that the de-shake techniques disclosed herein may be integrated into a variety of software and hardware devices without departing from the scope of this disclosure.

It should be understood that many variations are possible based on the disclosure herein. Although features and elements are described above in particular combinations, each feature or element may be used alone without the other features and elements or in various combinations with or without other features and elements. The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, digital versatile disks (DVDs), Blu-ray drives, or BD-ROM disks.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

What is claimed is:

1. A video de-shake system configured to apply camera shake compensation to video content received at a first frame rate, the system comprising:
   a classification engine configured to:
      convert the video content to a native frame rate, wherein the native frame rate is a frame rate at which the video content was created and is different from the first frame rate; and
      generate a classification of the video content based on at least one source characteristic; and
   a de-shake engine configured to:
      select a camera shake compensation algorithm with selected parameters from a plurality of camera shake compensation algorithms and parameters; and
      apply the selected camera shake compensation algorithm with the selected parameters to the video content based on the classification at the native frame rate; and
   the classification engine is further configured to restore the video content to the first frame rate after the camera shake compensation.

2. The system of claim 1, wherein the classification engine is configured to generate the classification based on the presence of closed caption data.

3. The system of claim 1, wherein the classification engine is configured to generate the classification based on the presence of copy protection data.

4. The system of claim 1, wherein the classification engine is configured to generate the classification based on a current frame rate associated with the video content.

5. The system of claim 1, wherein the classification engine is configured to generate the classification based on the native frame rate associated with the video content.

6. The system of claim 1, wherein the classification engine is configured to:
   perform an inverse Telecine process on the video content to determine the native frame rate; and
   generate the classification based on the native frame rate.

7. The system of claim 1, wherein the classification engine is configured to classify the video content as professional content or non-professional content.

8. The system of claim 1, further comprising:
   a device driver configured with the classification engine and de-shake engine.

9. A method for applying camera shake compensation to video content received at a first frame rate, comprising:
   converting the video content to a native frame rate, wherein the native frame rate is a frame rate at which the video content was created and is different from the first frame rate;
   generating a classification of the video content based on at least one source characteristic;
   selecting a camera shake compensation algorithm with selected parameters from a plurality of camera shake compensation algorithms and parameters;
   applying the selected camera shake compensation algorithm with the selected parameters to the video content based on the classification at the native frame rate; and
   restoring the video content to the first frame rate after the camera shake compensation.

10. The method of claim 9, wherein the classification is based on the presence of closed caption data.

11. The method of claim 9, wherein the classification is based on the presence of copy protection data.

12. The method of claim 9, wherein the classification is based on a current frame rate associated with the video content.

13. The method of claim 9, wherein the classification is based on the native frame rate associated with the video content.

14. The method of claim 9, further comprising:
   performing an inverse Telecine process on the video content to determine the native frame rate; and
   generating the classification based on the native frame rate.

15. The method of claim 9, further comprising:
   classifying the video content as professional content or non-professional content.

16. A non-transitory computer-readable storage medium storing a set of instructions for execution by a general purpose computer to perform a method for applying camera shake compensation to video content received at a first frame rate, the set of instructions comprising:
- a converting code segment for converting the video content to a native frame rate, wherein the native frame rate is a frame rate at which the video content was created and is different from the first frame rate;
- a generating code segment for generating a classification of the video content based on at least one source characteristic;
- a selecting code segment for selecting a camera shake compensation algorithm with selected parameters from a plurality of camera shake compensation algorithms and parameters;
- an applying code segment for applying the selected camera shake compensation algorithm with the selected parameters to the video content based on the classification at the native frame rate; and
- a restoring code segment for restoring the video content to the first frame rate after the camera shake compensation.

17. The non-transitory computer-readable storage medium of claim 16, wherein the instructions are hardware description language (HDL) instructions used for the manufacture of a device.

* * * * *